United States Patent [19]

Orbach et al.

[11] Patent Number: 4,732,438
[45] Date of Patent: Mar. 22, 1988

[54] SPLIT-IMAGE OPTICAL VIEWING INSTRUMENT

[75] Inventors: Zvi Orbach; Lea Ziph, both of Haifa; Shlomo Idan, Rehovot, all of Israel

[73] Assignee: Elbit Computers Ltd., Haifa, Israel

[21] Appl. No.: 860,882

[22] Filed: May 8, 1986

[30] Foreign Application Priority Data

May 16, 1985 [IL] Israel .................... 75213

[51] Int. Cl.⁴ .................... H04N 7/18
[52] U.S. Cl. .................... 350/1.1; 350/172; 358/108
[58] Field of Search ............ 350/1.1, 172, 540, 173; 358/43, 108

[56] References Cited

U.S. PATENT DOCUMENTS

| | | | |
|---|---|---|---|
| 3,816,654 | 6/1974 | Brightman | 358/108 |
| 3,889,052 | 6/1975 | Back | 358/108 |
| 4,237,492 | 12/1980 | Roth et al. | 350/172 |
| 4,375,913 | 3/1983 | Hajnal | 350/540 |
| 4,572,625 | 2/1986 | Arndt et al. | 350/540 |
| 4,613,895 | 9/1986 | Burkey et al. | 358/43 |
| 4,639,082 | 1/1987 | Loy | 350/172 |

Primary Examiner—John K. Corbin
Assistant Examiner—Martin Lerner
Attorney, Agent, or Firm—Benjamin J. Barish

[57] ABSTRACT

An optical viewing instrument, comprises a housing including an eyepiece for viewing a field; a beam splitter within the housing and splitting the field viewed via the eyepiece into a first image for direct viewing by a first observer, and a second image for viewing by a second observer; and a solid state image converter within the housing located to receive the second image and to convert it to electrical signals for reproduction at a remote location.

20 Claims, 7 Drawing Figures

SPLIT-IMAGE OPTICAL VIEWING INSTRUMENT

BACKGROUND OF THE INVENTION

The present invention relates to optical viewing instruments, and particularly to split-image optical viewing instruments which simultaneously present two (or more) images for direct viewing by two (or more) observers.

Split-image optical viewing instruments are used in a number of applications. One example of an application is in instruction wherein the same image is simultaneously viewed by one or more students and by an instructor. The split-images in such instruments are commonly produced by the use of a beam splitter. A known instrument of this type includes a vidicon image converter which receives one of the images from the beam splitter and converts it to electrical signals which are reproduced on a cathode ray tube at a remote location. The latter instrument, however, is very bulky and not resistant to shocks, thereby substantially limiting its use.

SUMMARY OF THE INVENTION

An object of the present invention is to provide a novel split-image optical viewing instrument having a number of advantages in the above respects over the latter type of instrument thereby greatly extending the potential applications for such an instrument.

According to a broad aspect of the present invention, there is provided an optical viewing instrument comprising a housing including an eyepiece for viewing a field; a beam splitter within the housing and splitting the field viewed via the eyepiece into a first image for direct viewing by a first observer, and a second image for viewing by a second observer; a solid state image converter within the housing and located to receive the second image and to convert same to electrical signals for reproducing the second image at a remote location; a focusing lens within the housing between the beam splitter and the image converter and movable towards and away from the image converter; and a manipulatable member on the outer face of the housing coupled to the focusing lens for moving it towards and away from the image converter.

According to further features in the preferred embodiment of the invention described below, the focusing lens is disposed within a carrier and the housing includes a coupling between the latter member and the carrier for moving the carrier and focusing lens towards and away from the beam splitter.

According to a still further important feature in the preferred embodiment described below, the housing includes a first section carrying the eyepiece and beam splitter along the optical axis of the eyepiece, and a second section attachable to the first section, the second section carrying the focusing lens and its carrier and the solid state image converter all in alignment with the beam splitter and perpendicularly to the optical axis of the eyepiece.

A split-image optical viewing instrument constructed in accordance with the foregoing features provides a number of important advantages over the previously known types, particularly the type including a vidicon image converter. Thus, the optical instrument can be constructed considerably more compactly and with a considerably higher resistance to shock. These advantages make the instrument particularly useful in sighting devices in tanks or other types of armored vehicles wherein space is at a premium and the environmental conditions of use, particularly shocks, are exceptionally severe. Such an application of the instrument in a tank, for example, permits the tank commander to conveniently view the same field as seen by the gunner, which application was heretofore not possible or practical with conventional gun-sighting instruments, nor with the known split-image instrument including a vidicon image converter because of the restrictions of space and the conditions of high shock present in such an application of the instrument.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
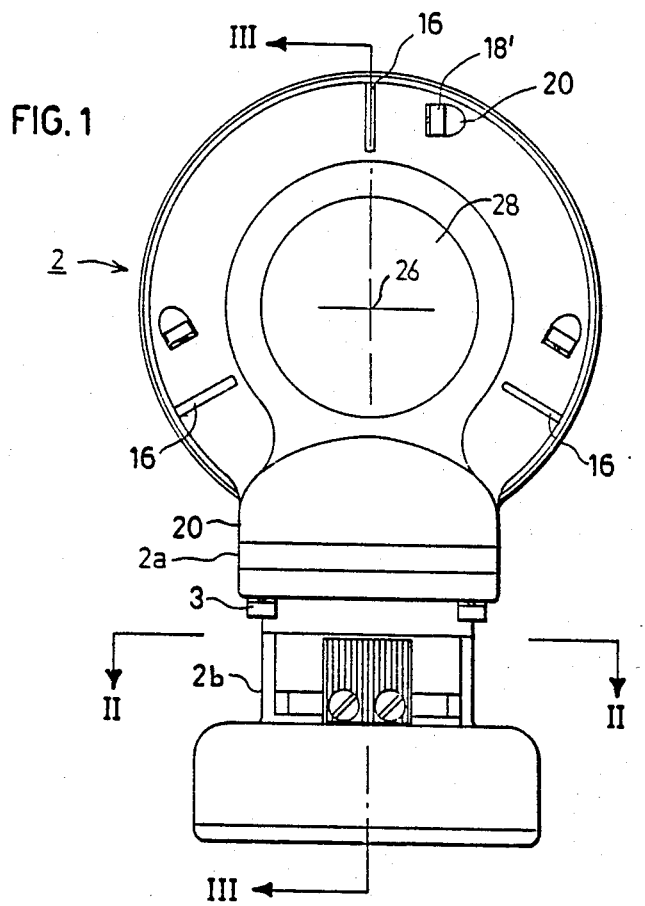
FIG. 1 is a rear elevational view illustrating one form of split-image optical viewing instrument constructed in accordance with the present invention.
Figure 2:
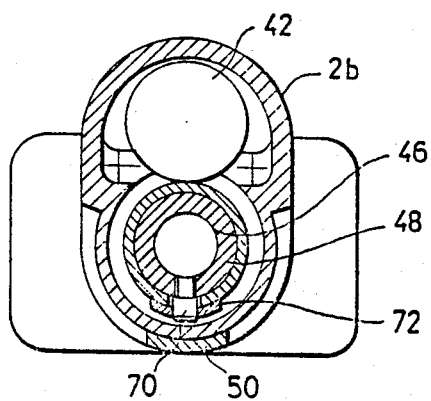
FIG. 2 is a transverse sectional view along lines II—II of FIG. 1.

The split-image optical viewing instrument illustrated in the drawings is particularly designed for use as a gun sight in a tank to enable the tank commander also to monitor the scene as viewed by the gunner. It will be appreciated, however, that this instrument could also be used in many other applications, for example to permit an instructor to view the field seen by the student, or to permit a field to be simultaneously viewed by a plurality of students.

Figure 3:
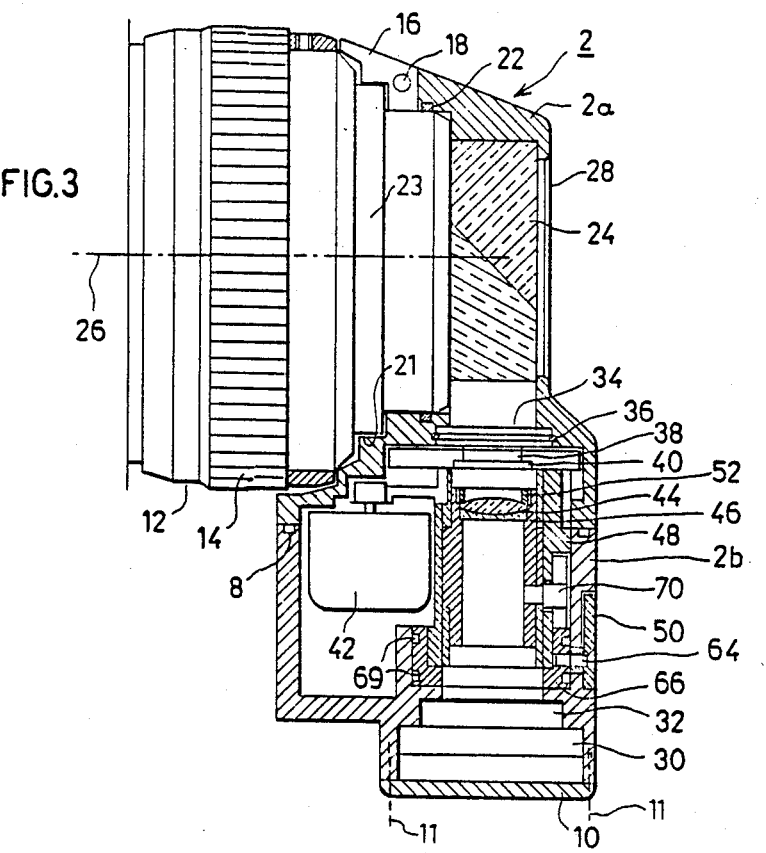
FIG. 3 is a longitudinal sectional view along lines III—III of FIG. 1.
Figure 4:
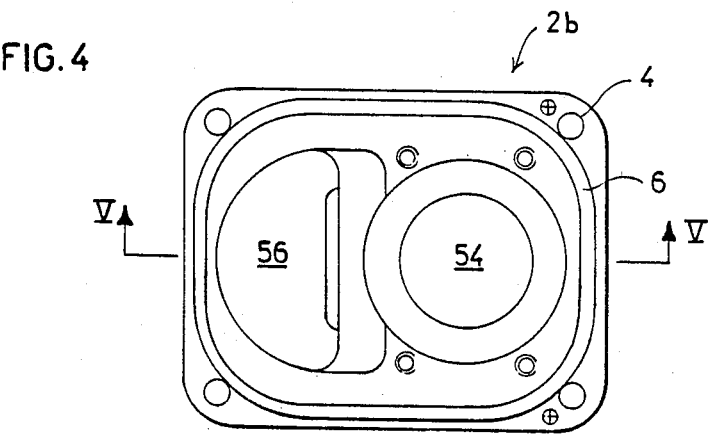
FIG. 4 is a top view of the lower housing section in the instrument of FIG. 1.

The instrument illustrated in the drawings comprises a housing, generally designated 2, constituted of an upper section 2a and a lower section 2b secured together by fasteners 3 (FIG. 1) passing through aligned openings 4 (FIG. 4) in the two sections. As also seen in FIGS. 3 and 4 the upper edge of the lower section 2b is flat but is formed with an annular recess 6 for receiving an annular sealing ring 8 producing an air tight seal when the two housing sections are secured together. The lower end of the lower housing section 2b is closed by a removable closure plate 10 and fasteners 11.

The upper housing section 2a carries an eyepiece, generally designated 12, including an adjustable focusing ring 14. Eyepiece 12 is removably clamped to housing section 2a. For this purpose, the upper end of housing section 2a is formed with a plurality (3, FIG. 1) of radially-extending slots 16 equally spaced around the circumference of the housing section, with each slot bridged by the shank of a pin 18 (FIG. 3). Each pin has a head 18' received within a recess 20 in housing section 2a to permit the pin to be threaded in order to increase or decrease the width of its respective slot 16. Thus, rotating pins 18 in one direction to increase the width of the slots 16 decreases the diameter of a socket 21 formed in the upper portion of housing section 2a and causes it to firmly clamp an annular shoulder 23 at the rear end of eyepiece 12; and rotating the pins in the opposite direction, decreases the width of the slots to release the eyepiece 12 and to permit it to be removed from housing sections 2a. A sealing ring 22 interposed between eyepiece 12 and an annular shoulder formed in the interface of housing section 2a effects an air-tight seal when the eyepiece is thus clamped to housing section 2.

Eyepiece 12, including its rotatable focusing ring 14, may be of a known type, and therefore further details of its construction are not illustrated herein.

A beam splitter 24 is housed within the upper housing section 2a in alignment with the optical axis 26 of eyepiece 12, between the eyepiece and a window 28 in the rear face of housing section 2a. Beam splitter 24, which may also be of known construction, passes therethrough a portion of the light received via eyepiece 12, and reflects another portion downwardly into the lower housing section 2b. Thus, the beam splitter is effective to split the field viewed via eyepiece 12 into a first image for direct viewing by one observer via window 28, and a second image reflected into the lower housing section 2b. The latter optical image is converted to electronic signals, transmitted to a remote location, and then reproduced back into an optical image for viewing by a second observer at the remote location.

The conversion of the optical image to electronic signals is effected by a solid state image converter 30 located in a compartment 32 in housing section 2b so as to receive the image reflected from beam splitter 24. Between beam splitter 24 and converter 30 are disposed the following elements: an infrared filter 34 retained within the upper housing section 2a by a retainer ring 36; an automatic iris 38 coupled to a drive 40 including a motor 42 mounted within the lower housing section 2b; and a focusing lens 44 fixed in one end of a tube 46 carried by a tubular carrier 48 slidably disposed within the lower housing section 2b. Focusing lens carrier 48 is slidable in the axial direction of the lower housing section 2b by moving a manipulatable member 50 in the form of a button slidable in the circumferential direction over the outer face of the lower housing section. Focusing lens 44 is retained and sealed within tube 46 by a sealing ring 52.

Figure 5:
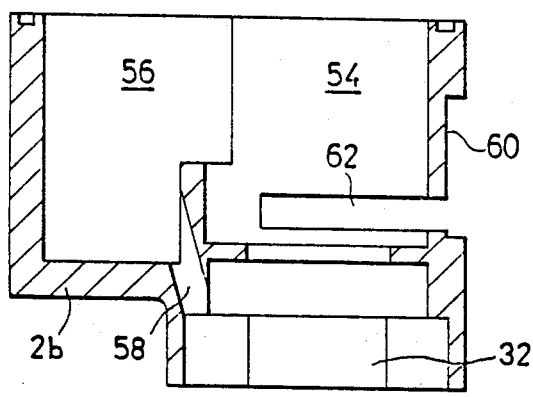
FIG. 5 is a sectional view along lines V—V of FIG. 4.

The structure of the lower housing section 2b for accomodating the foregoing elements is more particularly illustrated in FIGS. 4 and 5. It includes, in addition to compartment 32 (FIG. 3) for accomodating the solid state image converter 30, a cylindrical compartment 54 substantially aligned with compartment 32, and a further compartment 56 laterally of compartment 54. Compartment 54 receives the focusing lens assembly, including focusing lens 44, its tube 46 and its carrier 48; and compartment 56 receives motor 42 mounting and driving iris 38. A passageway 58 is formed from compartment 56 to compartment 32 for the electrical conductors to motor 42. These electrical conductors, together with the conductors from the solid state image converter 30 (FIG. 3) in compartment 32, pass through a slot (not shown) between the lower end of housing section 2b and removable cover plate 10 (FIG. 3) closing its compartment 32.

The lower housing section 2b further includes a circumferential recess 60 (FIG. 5) for accomodating button 50, and a circumferential slot 62 for accomodating a fastener 64 coupling button 50 to the focusing lens carrier 48 so as to move the focusing lens 44 in the axial direction when the button is manually moved in the circumferential direction. The latter coupling includes a rotatable sleeve 66 which is rotated when button 50 is manually moved in the circumferential direction, and a pin 70 coupled to sleeve 66 and the focusing lens carrier 48 such as to move the carrier in the axial direction when sleeve 66 is rotated by button 50. A pair of sealing rings 69 seal sleeve 66 within housing section 2b.

Figure 6:
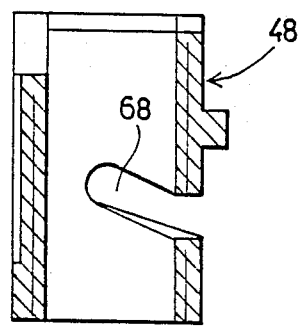
FIG. 6 is a sectional view illustrating the focusing lens carrier in the instrument of FIG. 1.
Figure 7:
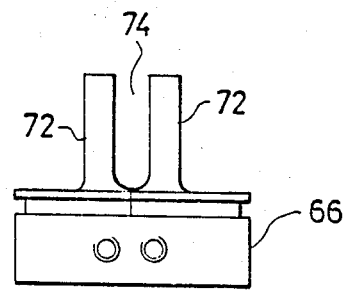
FIG. 7 is a side elevational view illustrating a coupling sleeve for moving the focusing lens in the instrument of FIG. 1.

The construction of the focusing lens carrier 48 and of the rotatable sleeve 66 to produce this operation are more particularly illustrated in FIGS. 6 and 7, respectively. Thus, as shown in FIG. 6, focusing lens carrier 48 is of tubular construction and is formed with an inclined slot 68 adapted to receive the enlarged head of a pin 70. Rotatable sleeve 66, as illustrated in FIG. 7, is formed with a pair of spaced, parallel fork arms 72 extending in the vertical direction and defining between them a vertical slot 74 receiving the outer end of the enlarged head of pin 70. The opposite end of pin 70 is of reduced diameter and is received within an opening formed in the focusing lens tube 46.

Thus, when button 50 is manually moved in one direction circumferentially of the lower housing section 2b, it rotates sleeve 66 whose fork arms 72 also rotate pin 70. Since pin 70 also passes through the inclined slot 68 in carrier 48, the rotation of pin 70 moves carrier 48 axially, this being permitted by slot 74 in sleeve 66. Tube 46, which is fixed to carrier 48 by pin 70, is also moved axially with carrier 48 to thereby move focusing lens 44 towards the beam splitter 24 and away from the image converter 30. Moving button 50 in the opposite direction circumferentially of the lower housing section 2b will move in a similar manner the focusing lens carrier 48 away from beam splitter 24.

The solid state image converter 30 disposed within the lower housing section 2b is preferably a charge coupled device (CCD) which converts the optical image received thereon into electrical signals. This converter, however, could also be a charge injection device (CID) which performs the same function. The electrical signals produced by converter 30 are transmitted via electrical conductors (not shown) to a cathode ray tube or other display device at a remote location for viewing by another observer there. The electrical signals from the solid state image converter 32 could also be fed to a printer for producing a hard copy reproduction of the image, or to a processing system for analyzing or otherwise processing the electrical signals.

It will thus be seen that the optical viewing instrument illustrated in the drawings can be constructed in a very compact shock-free manner making it particularly useful as a gunsight for tanks or the like, permitting the tank commander also to view the same field whenever desired as viewed by the gunner. Thus, the gunner (or other observer) sees the image transmitted through beam splitter 24 through window 28; and the tank commander (or other observer) sees the image reflected by beam splitter 24 to the solid state image converter 32, which image is converted thereby to electrical signals and reconverted back to the optical image at the remote location of the tank commander. Eyepiece 14 can be conveniently adjusted by the first observer by manipulating focusing ring 14; and focusing lens 44 can be conveniently adjusted by the same observer, under the direction of the second observer, by manipulating button 50. If desired, a remote control may be provided from the remote location to button 50 to enable the observer at the remote location directly to move focusing lens 44.

While the invention has been described with respect to one embodiment particularly useful for one application, namely as a tank gunsight, it will be appreciated that many variations and other applications, for example as an instruction aid, of the invention may be made.

Beam splitter 24 may be selective as to wave length and/or as to reflectivity. For example, the beam splitter may be selective as to wave length, so as to transmit more infrared radiation to the charge coupled device 30 than to the observer. A particularly desirable arrangement is one wherein, below the wave length of 0.7 $\mu$m most of the energy (e.g. 95%) is transmitted to the observer; and above this wave length most of the energy (e.g. 90%) is reflected to the charge coupled device 30. This selectivity can be obtained by selecting the coatings of the beam splitter in accordance with known characteristics.

Many other variations, modifications and applications of the invention will be apparent.

What is claimed is:

1. An optical viewing instrument, comprising:
a housing including an eyepiece for viewing a field;
a beam splitter within said housing and splitting the field viewed via said eyepiece into a first image for direct viewing by a first observer, and a second image for viewing by a second observer;
a solid state image converter within said housing and located to receive said second image and to convert same to electrical signals for reproducing said second image at a remote location;
a focusing lens within said housing between said beam splitter and said image converter and movable towards and away from said image converter;
and a manipulatable member on the outer face of said housing coupled to said focusing lens for moving same towards and away from said image converter.

2. The instrument according to claim 1, wherein said housing includes a first section carrying said eyepiece and said beam splitter along the optical axis of said eyepiece, and a second section attached to said first section and enclosing said focusing lens and said solid state image converter in alignment with said beam splitter and perpendicularly to said optical axis.

3. The instrument according to claim 1, further including an adjustable focusing ring carried by said eyepiece.

4. The instrument according to claim 1, wherein said focusing lens is disposed within a carrier movable towards and away from said beam splitter, said housing including a coupling between said manipulatable member and said carrier for moving said carrier and focusing lens towards and away from said image converter.

5. The instrument according to claim 4, wherein said manipulatable member is a button slidable circumferentially along the outer face of said housing; and wherein said coupling comprises a rotatable sleeve coupled to said slidable button for rotation thereby, and a pin having one end movable in a vertical slot formed in said sleeve and its opposite end movable in an inclined slot formed in said focusing lens carrier to move said carrier towards and away from said image converter by moving the button in the circumferential direction along the outer face of said housing.

6. The instrument according to claim 5, wherein said vertical slot in said rotatable sleeve is defined by a pair of spaced, parallel, fork arms secured to said sleeve.

7. The instrument according to claim 5, wherein said housing includes a first section carrying said eyepiece and said beam splitter along the optical axis of said eyepiece, and a second section attachable to said first section; said second section carrying said carrier, focusing lens, and solid state image converter in alignment with said beam splitter and perpendicularly to said optical axis.

8. The instrument according to claim 7, wherein said second housing section further includes an iris between said focusing lens therein and said beam splitter in the first housing section, said second housing section further including a motor drive for driving said iris.

9. The instrument according to claim 8, wherein said first housing section further includes an infrared filter between the beam splitter therein and the iris in the second housing section.

10. The instrument according to claim 7, wherein said first housing section is formed with a socket including a plurality of radial slots each bridged by a threaded pin, said threaded pins being rotatable in one direction to close said slots and thereby to reduce the diameter of said socket for clamping the eyepiece therein, or in the opposite direction to open said slots and thereby to increase the diameter of said socket for releasing said eyepiece from said first housing section.

11. The instrument according to claim 7, wherein said solid state image converter is housed within a compartment closed by a closure plate which is removable to provide access to said solid state image converter.

12. The instrument according to claim 1, wherein said solid state image converter is a charge coupled device.

13. The instrument according to claim 1, wherein said solid state image converter is a charge injection device.

14. The instrument according claim 1, wherein said beam splitter is selective according to wave length.

15. The instrument according to claim 14, wherein said beam splitter is selective according to wave length such that below a wave length of about 0.7 $\mu$m it transmits most of the energy to the observer, and above the said wave length it transmits most of the energy to the solid state image converter.

16. An optical viewing instrument, comprising:
a housing including an eyepiece having a window at one end for viewing a field along the optical axis of the eyepiece;
a beam splitter within said housing in alignment with said optical axis and splitting the field viewing via said eyepiece into a first image for direct viewing via said window by a first observer, and a second image for viewing by a second observer;
a solid state image converter within said housing and located to receive said second image and to convert same to electrical signals for reproducing said second image at a remote location;
a focusing lens within said housing between said beam splitter and said image converter and movable towards and away from said image converter;
and a manipulatable member on the outer face of said housing coupled to said focusing lens for moving same towards and away from said image converter;
said housing including a first section carrying said eyepiece and said beam splitter along the optical axis of said eyepiece, and a second section attached to said first section and enclosing said focusing lens and said solid state image converter in alignment with said beam splitter and perpendicularly to said optical axis.

17. The instrument according to claim 16, further including an adjustable focusing ring carried by said eyepiece;

said said focusing lens being disposed within a carrier movable towards and away from said image converter; said housing further including a coupling between said manipulatable member and said carrier for moving said carrier and focusing lens towards and away from said beam splitter.

18. The instrument according to claim 17, wherein said manipulatable member is a button slidable circumferentially along the outer face of said housing; and wherein said coupling comprises a rotatable sleeve coupled to said slidable button for rotation thereby, and pin having one end movable in a vertical slot formed in said sleeve and its opposite end movable in an inclined slot formed in said focusing lens carrier to move said carrier towards and away from said image converter by moving the button in the circumferential direction along the outer face of said housing.

19. The instrument according to claim 16, wherein said second housing section further includes an iris between said focusing lens therein and said beam splitter in the first housing section, and a motor drive for driving said iris; and wherein said first housing section further includes an infrared filter between the beam splitter therein and the iris in the second housing section.

20. The instrument according to claim 16, wherein said beam splitter is selective according to wave length such that below a wave length of about 0.7 $\mu$m it transmits most of the energy to the observer, and above the said wave length it transmits most of the energy to the solid state image converter.

* * * * *